July 7, 1970   D. D. GROSSMAN   3,519,328
SHORT DURATION OPTICAL SHUTTER
Filed Nov. 20, 1967
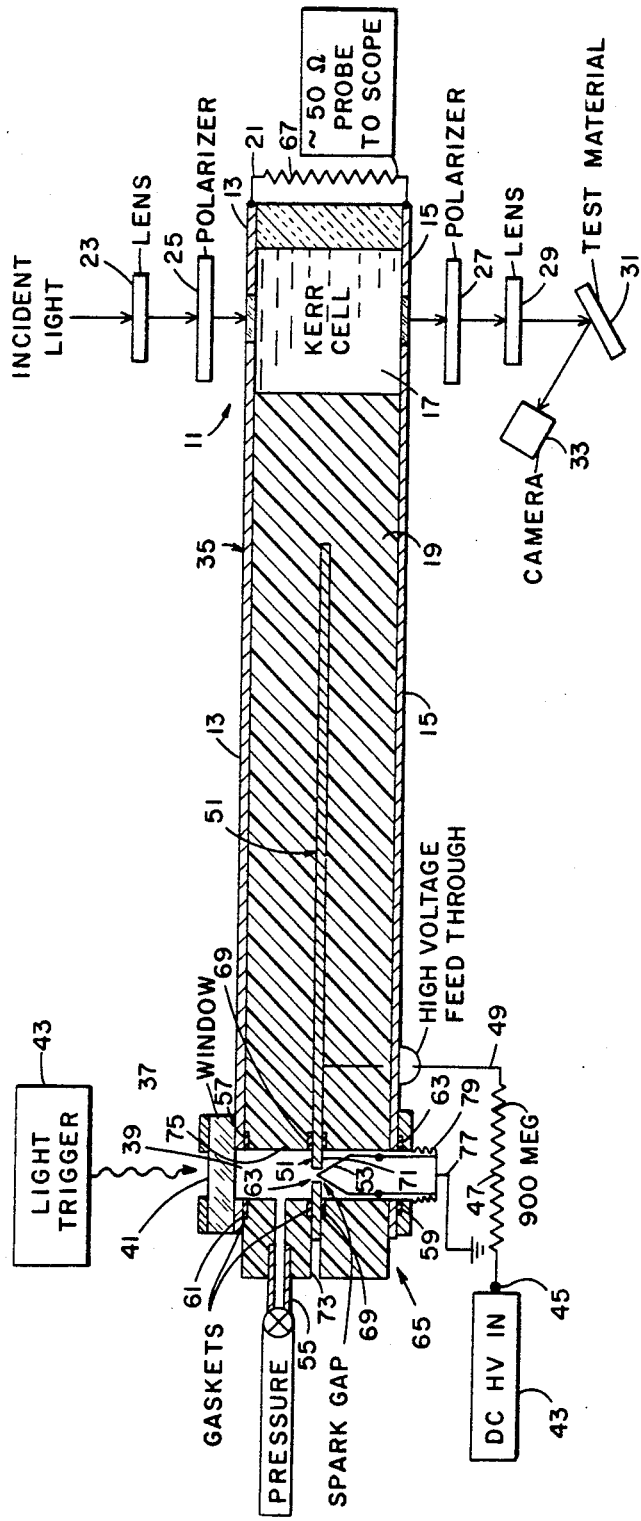
INVENTOR.
DAVID D. GROSSMAN

United States Patent Office 3,519,328
Patented July 7, 1970

3,519,328
SHORT DURATION OPTICAL SHUTTER
David D. Grossman, Cambridge, Mass., assignor to the United States of America as represented by the United States Atomic Energy Commission
Filed Nov. 20, 1967, Ser. No. 684,135
Int. Cl. G02f 1/26
U.S. Cl. 350—150     5 Claims

ABSTRACT OF THE DISCLOSURE

A short duration speed optical shutter having a light-triggered spark-gap switch that activates a high voltage impulse generator to cause a Kerr cell to transmit up to 100% of incident polarized light for a duration that may be adjusted from 1 to 10 nanoseconds.

SUMMARY OF THE INVENTION

This invention was made in the course of, or under a contract with the United States Atomic Energy Commission.

This invention produces a high intensity, short duration light pulse with Kerr cell electrodes forming a spark actuated high voltage pulser. In one embodiment the Kerr cell electrodes form a parallel plate transmission line that is actuated by a light triggered spark gap switch having an input electrode running parallel with the transmission line whereby application of the light trigger pulse to the spark gap switch energizes the transmission line so as to open the Kerr cell for transmission of up to 100% of one polarization of incident light for a duration of 10 nanoseconds or less. With the proper selection of elements, as described in more detail hereinafter, the desired short high intensity light pulse is obtained, e.g. in the range of from 1 to 10 nanoseconds.

BACKGROUND OF THE INVENTION

In the field of physics, it is desirable to provide short duration, high intensity bursts of light. Such pulses, for example, are useful in ultra-high speed photography, radar systems for measuring distances accurately and in hydrodynamic research requiring systems for measuring the motion of molecules in solids and liquids that are too rapid for observation by conventional means, such as rotating mirror framing cameras, and in exploring the many stage interactions when light strikes matter with a short high intensity light pulse that doesn't destroy the matter. One system that has been employed for hydrodynamic research at elevated temperatures where high energy densities are accompanied by high particle and shock velocities, rapid phase transitions and the resulting small scaling of the physical events making interframe times of less than $10^{-3}$ seconds desirable, has been the system described in U.S. Pat. 3,116,660. This system employs a Kerr cell shutter means, optical relay delay system means, and a microscopic or telescopic optical means for looking at the event and of forming images thereof. This system has the advantage that interframe time limitations are not imposed by the rotating mirror framing cameras known heretofore but by the Kerr cell and the synchronizing electronic circuits. Accordingly, it has been advantageous to provide a Kerr cell having fast electronic circuitry for hydrodynamic research. It has also been advantageous to provide a high intensity light pulse that is adjustable from 1 to 10 nanoseconds.

It is an object of this invention therefore, to provide a rapid acting Kerr cell shutter with a rapid acting actuating means for producing a short duration, high intensity light pulse for the non-destructive hydrodynamic study of test material;

It is a further object to provide a Kerr cell shutter system with the least interference with the transmission of incident light therethrough;

It is a still further object to provide a Kerr cell shutter system with an adjustable shutter speed of from 1 to 10 nanoseconds.

BRIEF DESCRIPTION OF THE DRAWING

In the drawings where like elements are referenced alike, the figure is a partial schematic view of the Kerr cell shutter system of this invention.

DESCRIPTION OF THE PREFERRED EMBODIMENTS

Referring to the figure, a Kerr cell 11 is shown having electrodes 13 and 15 adapted to hold a suitable dielectric fluid 17 for producing a Kerr effect, which is well known as shown by the systems described in U.S. Pats. 3,169,163 and 3,164,665. A description of this well known Kerr effect is found in The International Dictionary of Physics and Electronics, D. Van Nostrand Co., Inc., 1956. One suitable dielectric fluid is nitrobenzene, since it matches the dielectric constant of insulator 19, which is advantageously an acrylic resin plastic sheet. As is convenient, a lead 21 connecting the electrodes 13 and 15 includes a probe (not shown) to an oscilloscope. By suitably energizing the cell 11 incident light passes through electrodes 13 and 15 of cell 11 from lens 23 and polarizer 25 and through crossed polarizer 27 and lens 29 whereby the light reflected by test material 31 enters camera 33. The camera may, however, be mounted in any suitable location as below the test material. Also, the incident light may be directed through cell 11 at right angles to the plane of the paper of the figure.

In accordance with this invention, electrodes 13 and 15 extend longitudinally in a parallel plate transmission line 35 along insulator 19 to form a high voltage pulser 37. To this end the electrodes 13 and 15 and insulator 19 extend from Kerr cell 11 along insulator 19 and terminate in a spark gap chamber 39 extending along an axis at right angles to the direction of the transmission line 35. The chamber 39 has a window 41 at one end for the transmission of a light impulse from source 43 therethrough for triggering the spark discharge of the high voltage direct current from input 45, resistor 47, lead 49 and a central electrode 51 mid-way between electrodes 13 and 15 to a V-shaped electrode 53 at ground potential. Advantageously, the chamber 39 is pressurized through pipe 55 with a suitable ionizable gas, such as argon, while suitable gaskets 57, 59, 61 and 63 seal chamber 39 against the leakage of the gas pressure therefrom. This permits light source 43 to trigger the spark gap 63 formed between electrodes 51 and 53 for the spark discharge gap 63 so that a large direct current rapidly passes from input 45 through spark gap switch 65 of pulser 37.

In operation, the spark gap is pressurized to about 5 atmospheres so that its impedance is below that of the transmission line. Also, the length of the charged line provided by central electrode 51 for the spark gap 63 determines the duration of the high voltage pulse therein and hence the open time of the Kerr cell shutter 11. For the prototype, this time is 2 nanoseconds but this charge line 51 can be changed in length to provide adjustable pulse lengths from 1 to 10 nanoseconds long. Advantageously, the spark gap switch 65 is light triggered through window 41 by a laser pulse. A laser pulse is advantageous since it may be shorter than 1 nsec. For example, a conventional "mode-lock" laser puts out a train of pulses that are about 1 picosec. long and are separated by a few nsec. Therefore, this device may select a single piosecond light pulse. However, an ultraviolet flash source 43 may also be used.

The output from pulser 37 caused by the spark discharge across switch 65 travels a few inches down central electrode 51 and correspondingly produces a pulse in the parallel plate transmission line 35 provided by electrodes 13 and 15, which are terminated with a resistance 67 equal to the characteristic impedance of the transmission line 35. In one embodiment this resistance 67 is about 50Ω and the Kerr cell extends perpendicular to the axis of the transmission line 35.

The electrode 51 is force fitted into gasket 69 mid-way between electrodes 13 and 15 in insulator 19. Accordingly, the distance this electrode extends into or beyond insulator 19 is adjustable by merely moving this electrode 51 inwardly or outwardly in gasket 69. To this end, portion 71 of electrode 51, which forms an annular gap 63 with electrode 53, is biased through slit 73 between gaskets 59, which are sandwiched between portion 71 of electrode 51 and portion 75 of insulator 19 on one side of chamber 39. In this regard, a small movement of the electrode 51 adjusts the shutter speed of cell 11 from 1 to 10 nanoseconds without appreciably affecting the operation of spark gap switch 65. If, however, electrode 53 needs adjusting, this is accomplished by moving bar 77 on grounded bellows 79, which connects with electrode 53 and seals the bottom of chamber 39. This bellows 79 also resiliently absorbs any spark induced expansion of the gas in chamber 39 while maintaiinng the desired position of electrode 53 for the sequential firing of switch 65 and the resultant opening and closing of cell 11.

While this invention has been described as supplying a high intensity, short duration light pulse, it is also understood that it can also operate simply as a camera shutter for photographing a process carried out at high brightness. In this case, the camera is suitably placed at one side of the cell 11 of this invention to receive light producing an image that passes through the cell when it is open.

This invention has the advantage of providing practical and effective system for producing short, high intensity light pulses for hydrodynamic research, high speed photography or other purposes where such pulses are employed in the non-destructive testing of materials. The system of this invention, for example, is adapted to produce light pulses between 5 and 50 million watts for 2 nanoseconds or less. Moreover, the system of this invention selectively provides an easy, effective, and operably adjustable system for producing high intensity light pulses from 1 to 10 nanoseconds in duration.

What is claimed is:

1. A short duration, high intensity optical shutter, comprising the combination of a light source, crossed polarizers, a Kerr cell having a dielectric fluid located between said polarizers and resistance connected, spaced apart, actuating electrodes forming a parallel plate transmission line for applying an electric field across said Kerr cell wherein one electrode forms a grounded end and an end which is connected by said resistance, and said other electrode forms an end connected by said resistance and an opposite free end, and means having a light triggered spark gap switch forming a central conductor in a portion of said parallel plate transmission line for causing a spark discharge in said spark gap when said spark gap receives a light trigger pulse for conducting said spark discharge to the grounded end of said one electrode for actuating said transmission line during a short period of time for selectively causing said spaced apart actuating electrodes to open and close said Kerr cell for the transmission of light from said light source through said Kerr cell for producing a short, high intensity light pulse.

2. The invention of claim 1 in which said central conductor has a power source and is operably, adjustably, and selectively located midway between said spaced apart actuating electrodes for adjusting the duration of said light transmission through said Kerr cell by selectively changing the location of said central conductor relative to said transmission line for changing the duration of time said transmission line is actuated by said light actuated spark gap switch when the latter is triggered by said light pulse thereto to conduct energy to said grounded end of said one electrode.

3. The invention of claim 1 in which said central conductor for causing a spark discharge in said spark gap switch when said light triggered spark gap is light triggered, is selectively, adjustably located for operably adjusting the actuation time of said spark gap switch.

4. The invention of claim 1 in which the spark gap switch has a gas pressurized chamber forming an axis at right angles to the direction of said spaced apart actuating electrodes, and said spaced apart actuating electrodes are at opposite ends of said chamber with said spark gap switch mid-way therebetween.

5. In a Kerr cell having a dielectric fluid, crossed polarizers, said Kerr cell located between said crossed polarizers, a light source, spaced apart, actuating electrodes connected to said Kerr cell, and means for energizing said spaced apart actuating electrodes for causing said Kerr cell to transmit light from said light source through said Kerr cell and crossed polarizers, comprising gas containing, spark gap means, and light trigger means for actuating said spark gap means to produce a spark discharge for energizing said actuating electrodes for causing said Kerr cell to transmit said light, the improvement, comprising parallel plate transmission line means having first and second, parallel, spaced apart plates connected through a resistance at one end to form said spaced apart actuating electrodes, and forming one opposite free end, and one grounded end for connecting said spark discharge to said spaced apart actuating electrodes and said Kerr cell for actuating the same for utilizing the full voltage of said spark discharge for actuating said Kerr cell to transmit said light, a longitudinally extending insulator interposed between said first and second, parallel, spaced apart plates along a portion of the length of said plates, and interposed between said dielectric fluid and said spark gap means at the opposite ends of said insulator, and central conductor means extending selectively adjustably in a portion of said insulator from one end thereof intermediate said plates, parallel therewith, terminating at a distance from said Kerr cell and having a high voltage source for producing a spark discharge producing potential in said spark gap means for producing said spark discharge when said spark gap means receives a light trigger pulse from said light trigger means, said central conductor being adjustable for changing the location of said central conductor relative to said spark gap means for changing the time duration during which said spark discharge energizes said actuating electrodes for changing the time duration during which said Kerr cell and polarizers transmit light from said light source.

References Cited

UNITED STATES PATENTS

| | | | |
|---|---|---|---|
| 3,041,936 | 7/1962 | Hull | 350—150 |
| 3,295,012 | 12/1966 | Barbini | 315—149 |
| 3,432,664 | 3/1969 | Robison | 250—98 |

FOREIGN PATENTS 1,456,884 9/1966 France.

DAVID SCHONBERG, Primary Examiner

P. R. MILLER, Assistant Examiner

U.S. Cl. X.R.

95—53; 250—199; 350—160